Figure 1:
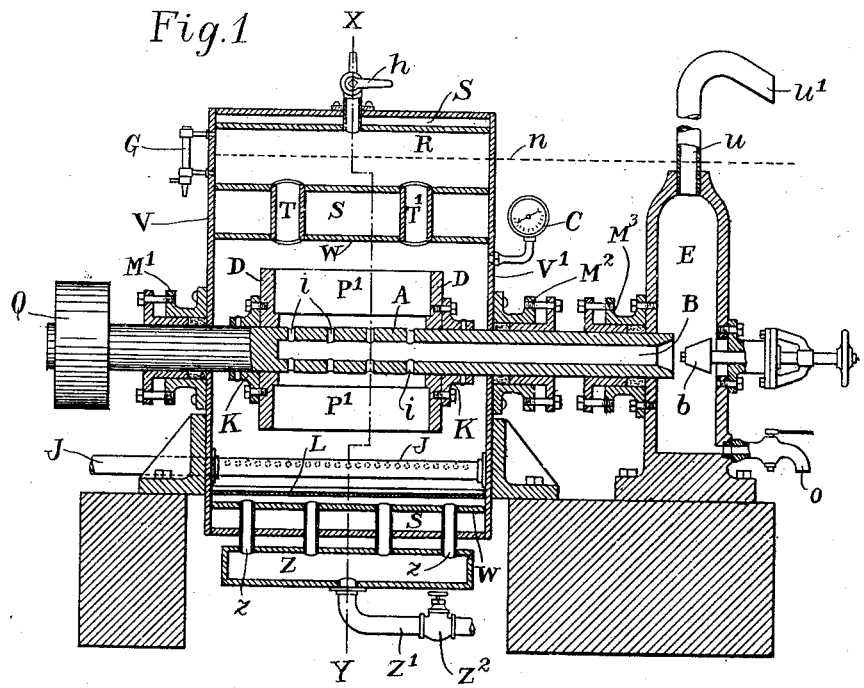

J. J. HOMANS.
PROCESS FOR SEPARATING SCUM FROM SUGAR JUICE.
APPLICATION FILED NOV. 23, 1909.

978,750.                                    Patented Dec. 13, 1910.

WITNESSES:

INVENTOR,
JACOBUS JOHANNES HOMANS
BY
ATTORNEY.

UNITED STATES PATENT OFFICE.

JACOBUS J. HOMANS, OF SAMARANG, JAVA.

PROCESS FOR SEPARATING SCUM FROM SUGAR-JUICE.

978,750. Specification of Letters Patent. Patented Dec. 13, 1910.

Original application filed October 12, 1909, Serial No. 522,319. Divided and this application filed November 23, 1909. Serial No. 529,549.

*To all whom it may concern:*

Be it known that I, JACOBUS JOHANNES HOMANS, a subject of the Queen of the Netherlands, residing at Samarang, in the county of Samarang, Isle of Java, have invented a new and useful Process for Separating Scum from Sugar-Juice; and I do hereby declare the following to be a full, clear, and exact description of the same.

This application is a division of my application, Serial No. 522,319, filed October 12th, 1909, for Letters Patent of the United States.

The present invention relates to a process for separating scum (meaning thereby, all muddy matter) from sugar-juice. By "sugar-juice," I mean (1) the raw juice or sap of sugar-producing plants, roots or trees, and (2) in the manufacture and refining of sugar, a more or less concentrated solution of sugar.

I have found that when the temperature of the sugar-juice has been raised to the "cracking point" (about 94° C. or 95° C.) in the defecation process, the temperature at which the layer of scum is beginning to burst—or it may be heated to over the "cracking point," or even over 100° C. under pressure—such sugar-juice can be clarified, and freed from the scum, by centrifugal force, if the temperature of the mass is thereafter, during the separation, maintained not lower than that of the "cracking point"—the best results being obtained between 100° C. and 115° C. The maintenance of this temperature (at least, as high as the "cracking point") is essential to the success of my process. It not only shortens the time required for clarifying the juice, but the latter is much clearer than by any other process known to me. Prior inventors have not endeavored to prevent cooling of the sugar-juice, the result being that, upon lowering of the temperature, some of the scum became soluble in the juice, and the latter could not be cleared, remaining dark and muddy. On the contrary, I intentionally maintain the mentioned temperature not lower than that of the "cracking point"—during the various steps hereinafter recited.

In order that my process shall be practiced, I may employ any suitable vessel (for instance, that shown in the accompanying drawings and my aforesaid application, Serial No. 522319) wherein the juice is subjected to centrifugal action, and heat the juice—preferably by applying heat to the exterior of the vessel—while under treatment. As a result, the temperature of the sugar-juice is maintained above 95° C., and the scum is completely separable from the remaining juice. While the sugar-juice is thus heated, it is subjected to centrifugal action, the scum is driven to the wall of the vessel and the remaining clear sugar-juice passes off separately, preferably at the center of the axis of rotation of the device employed for subjecting the liquid to centrifugal action.

I desire it to be understood that when I use the word "scum," in this specification and claim, I mean thereby, all muddy residue separated from the sugar-juice.

The operation may be continuous, sugar-juice being constantly supplied while clarified juice and scum are each constantly and separately discharged.

Figure 2:
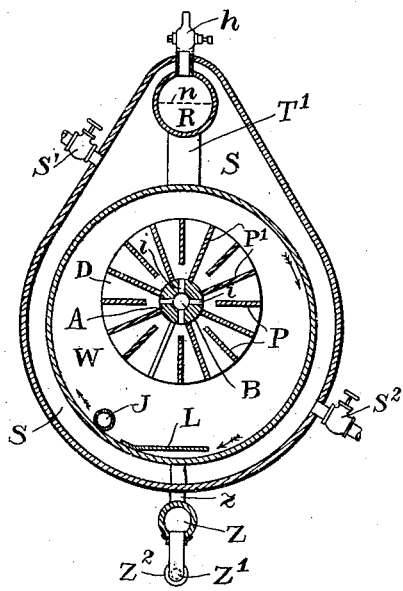

Referring to the accompanying drawings, which show an apparatus for carrying out the process, Figure 1 is a longitudinal sectional view, and Fig. 2 is a vertical section thereof, on the line X—Y of Fig. 1.

The illustrated form of apparatus comprises a vessel W, a steam-chamber (S, S) around said vessel, a perforated pipe J for supplying juice thereinto, a plate, L, for directing separated scum to a discharge passage, and a rotatable shaft, A—B, made hollow for leading off clarified juice, and a succession of paddles, P and P¹, constituting a centrifugal device, rotatable with the shaft. The vessel W is stationary and is preferably cylindrical in shape, with end walls V and V¹. It is provided with a supplementary chamber R, connected therewith by pipes T and T¹. The vessel has a plate L, free along one edge, and from the lower part of the passage thus formed, there lead several pipes $z$, connecting with a collecting chamber Z, and a draw-off pipe $z^1$, the latter controlled by any suitable valve $z^2$ and leading to any suitable apparatus, for instance, a pump having one-eighth the capacity of the juice-pump. A metallic or other casing incloses or surrounds the vessel W, the supplementary chamber R, the scum passage and portions of the outlet pipes $z$. Steam is supplied in any usual manner into the chamber, S, thus formed, and the desired object—maintaining the fluid above 95° C. during the separating treatment—is thus attained, by heating the exterior of the vessel W and chamber R. Suitable inlet and outlet ports, $S^1$ and $S^2$, may be provided for the inlet of steam and egress of water. A supply pipe J is let into the vessel W, and is therein provided with a number of perforations for directing sugar-juice in the direction of the rotation of the paddles. Said pipe is preferably disposed near the wall of chamber W, slightly in advance (in the direction indicated by the arrows) of the closed edge of plate L.

The chamber R is shown as provided with a gage-glass G, while the vessel W is provided with a thermometer, C, for indicating the temperature of the sugar-juice.

The device, within the vessel for subjecting the juice to centrifugal action, is shown as provided with a shaft A—B to rotate about a horizontal axis disposed eccentrically of the vessel, a little above the center of said vessel. At one end A (outside of the vessel) a driving pulley, Q, is secured upon the shaft. The other end (B) of the shaft is hollowed to a point well within the vessel, and a number of perforations ($i$) through said shaft, between the end-disks hereafter mentioned, connect the interior of the vessel and the hollow of the shaft. The shaft carries, within the vessel, end disks, D, D, secured in place by clamping-rings K, K, and the disks are utilized for holding in relation a succession of radially-disposed paddles P and $P^1$, the latter alternating with the former (as shown in Fig. 2) and being of lesser width, so as to leave an unobstructed passage thereunder for the juice to enter the perforations $i$. For good results, I prefer that the outer edges of the plates P and $P^1$ shall be coincident with the outer edges of the disks D, D. In number, the paddles P, $P^1$, may range from two to thirty-two, according to the diameter of the disks D, and to the speed at which the shaft is to be driven. The hollow end, B, of the shaft leads into a chamber E, which is provided, at its top, with an outlet pipe $u$, $u^1$, and with a draw-off tap $o$. At one side, and opposite the discharge opening of the hollow shaft, the chamber E carries a valve $b$, which may be advanced or retracted by a connected handle, to control or cut off the discharge of sugar-juice into the chamber. The shaft passes through stuffing boxes $M^1$, $M^2$, $M^3$, of any suitable construction.

In operation, steam is turned into the chamber S and the vessel W is heated (say, to 110° C.). The hollow axle has been closed by the valve $b$, and a cock $h$ has been opened to permit air to escape from vessel W and supplemental chamber R. Sugar-juice, at a temperature of not less than the cracking point (94°–95° C.), of the defecating point, and preferably not higher than 115° C., is then supplied—preferably by pumping—through the perforated pipe J into the vessel W and rises into the supplemental chamber R until it reaches the level indicated at $n$; thereupon the supply is stopped and cock $h$ is closed. As a part of the scum from the defecation process contains air and other gases, it will be preferable to convey the juice, before centrifugal action, to a vessel which permits the gases to escape. The presence of the steam or gases in the scum would tend to keep some thereof lighter than other impurities. When the scum is freed from the steam or gases, in the vessel aforesaid, or otherwise, all of the impurities have about the same specific gravity. The level indicated (at $n$) should be maintained, as nearly as possible, during the operations of the apparatus; and, in no case, should the level of the liquid be permitted to fall below the bottom of the pipes T and $T^1$. The shaft is then rotated until it reaches the desired speed, and, in a short time, the valve $b$ may be opened. Simultaneously with the opening of the valve, the juice-pump is put in action. Upon rotation of the shaft, in the direction indicated by the arrow, the paddles cause the scum (relieved of air and steam, and therefore heavier than juice as aforesaid) to be driven to the wall of the cylinder and to be carried in said direction, to the passage underneath the plate L, which directs said scum to the outlet pipes $z$. The remaining sugar-juice passes, by the openings $i$, into the hollow shaft. That quantity of juice first discharged through the shaft may not be sufficiently clear. In such event, it may be drawn off by faucet $o$ and returned for clarification. Clarified sugar-juice may be drawn, through pipes $u$ and $u^1$, from the chamber E. I have secured good results, when the outlet $u^1$ is about eight meters above the usual level of juice in chamber R.

The operation may be continuous, sugar-juice being constantly supplied to the vessel W, and clarified juice being constantly discharged from shaft-end B into chamber E. When no further juice is to be supplied to the apparatus, the valve $b$ must close the discharge through the shaft. The same must be done, whenever the rotation of the shaft is to be stopped.

I have ascertained, by experience, that an apparatus of the character illustrated, and having disks three feet in diameter and blades three feet long, will, at 500 revolutions per minute, clarify juice from 800 tons of sugar-cane or sugar beets, in twenty-four hours.

The present process is useful for clarifying sugar-juice obtained by any suitable process. In the case of sugar-juice from the defecation process, the maintenance of the before-mentioned temperature is necessary, while for clarifying juice from other processes, for instance, the carbonation process, that temperature is desirable.

What I claim is:

The process of separating scum from sugar-juice, which consists in subjecting the mixture to centrifugal action, thereby separating the scum and sugar-juice, according to their respective specific gravities, into two cylindrical layers, the scum forming an outer layer and the remaining juice forming an inner layer, all while heating and maintaining the material at a temperature not lower than that of the "cracking point" of the defecation process, and removing the scum and the separated juice each separately.

In testimony whereof, I have signed my name to this specification in the presence of two subscribing witnesses.

J. J. HOMANS.

Witnesses:
 JOHN HERMAN HOVING,
 WM. H. BERRIGAN.